US007480903B2

(12) United States Patent
Eguchi et al.

(10) Patent No.: US 7,480,903 B2
(45) Date of Patent: Jan. 20, 2009

(54) OPERATION DATA COLLECTION SYSTEM FOR WORK MACHINE

(75) Inventors: Yoshinori Eguchi, Tsuchiura (JP); Fujio Matsuda, Nagareyama (JP)

(73) Assignee: Hitachi Construction Machinery Co., Ltd., Tokyo (JP)

( * ) Notice: Subject to any disclaimer, the term of this patent is extended or adjusted under 35 U.S.C. 154(b) by 617 days.

(21) Appl. No.: 10/507,914

(22) PCT Filed: Mar. 20, 2003

(86) PCT No.: PCT/JP03/03415

§ 371 (c)(1),
(2), (4) Date: Sep. 16, 2004

(87) PCT Pub. No.: WO03/081434

PCT Pub. Date: Oct. 2, 2003

(65) Prior Publication Data

US 2005/0149341 A1 Jul. 7, 2005

(30) Foreign Application Priority Data

Mar. 25, 2002 (JP) ............................ 2002-083312

(51) Int. Cl.
*G06F 9/44* (2006.01)

(52) U.S. Cl. ..................................................... 717/168

(58) Field of Classification Search ............ 340/870.16, 340/988; 701/14; 717/168–171, 175, 178
See application file for complete search history.

(56) References Cited

U.S. PATENT DOCUMENTS

| | | | | |
|---|---|---|---|---|
| 6,367,077 | B1 * | 4/2002 | Brodersen et al. | 717/170 |
| 6,425,125 | B1 * | 7/2002 | Fries et al. | 717/168 |
| 6,614,361 | B1 | 9/2003 | Kinugawa | |
| 6,874,692 | B2 * | 4/2005 | Ueda et al. | 236/51 |
| 7,093,003 | B2 * | 8/2006 | Yuh et al. | 709/219 |

(Continued)

FOREIGN PATENT DOCUMENTS

| | | |
|---|---|---|
| CN | 1248751 A | 3/2000 |

(Continued)

OTHER PUBLICATIONS

Meseck, "Data Management: Lasting Impact of the wild, Wild, Web", May 2001, ACM, pp. 569-570.*

(Continued)

*Primary Examiner*—Wei Y Zhen
*Assistant Examiner*—Anna Deng
(74) *Attorney, Agent, or Firm*—Oliff & Berridge, PLC

(57) ABSTRACT

An operation data recording device 11 mounted at a work machine detects and records operation data of the work machine. The operation data is collected by an external terminal 13 and transmitted from the external terminal 13 to a server 23 located in a remote place. When the operation data is collected by the external terminal 13, a program for the operation data recording device of the work machine is updated to the latest version by the external terminal 13. When transmitting the operation data from the external terminal 13 to the remote server 23, an external terminal program and a program for the operation data recording device stored in the external terminal 13 are updated to the latest versions.

5 Claims, 5 Drawing Sheets

U.S. PATENT DOCUMENTS

| | | | | |
|---|---|---|---|---|
| 2006/0288344 | A1 * | 12/2006 | Brodersen et al. | 717/168 |

FOREIGN PATENT DOCUMENTS

| | | | |
|---|---|---|---|
| EP | 0 989 525 | A2 | 3/2000 |
| JP | A 59-172088 | | 9/1984 |
| JP | A 09-128605 | | 5/1997 |
| JP | A 09-305839 | | 11/1997 |
| JP | A 10-027094 | | 1/1998 |
| JP | A 10-212739 | | 8/1998 |
| JP | A 11-065827 | | 3/1999 |
| JP | 2000-076505 | | 3/2000 |
| JP | A 2000-259729 | | 9/2000 |
| JP | A 2001-236536 | | 8/2001 |
| JP | A 2002-015008 | | 1/2002 |
| JP | A 2002-30697 | | 1/2002 |
| WO | WO 01/73218 | A1 | 10/2001 |
| WO | WO 01/73633 | A1 | 10/2001 |
| WO | WO 02/08527 | A1 | 1/2002 |

OTHER PUBLICATIONS

Salzberg et al. “Comparison of Access Methods for Time-Evolving Data”, Jun. 1999, ACM CSUR vol. 31 Issue 2, pp. 158-221.*

* cited by examiner

OPERATION DATA COLLECTION SYSTEM FOR WORK MACHINE

INCORPORATION BY REFERENCE

The disclosure of the following priority application is herein incorporated by reference:

Japanese Patent Application No. 2002-083312 filed Mar. 25, 2002.

TECHNICAL FIELD

This invention is related to a system for collecting operation data of a work machine in which software used to record or collect the data can be updated with ease.

BACKGROUND ART

Recently, various operation data of the work machine, e.g., a hydraulic excavator, are collected and the collected data are then used to manage the work machine. For instance, Japanese Laid-Open Patent Publication No. 2000-259729 discloses a system that stores the data collected from a work machine into a database.

The data may be gathered as follows. The data acquired in advance by an operation data recording device installed in each work machine is collected by a user, a service person of the work machine, etc., by means of an external terminal, for instance, a laptop computer. The collected operation data, which has been subjected to data processing such as graphing, is used to manage the machine.

A manufacturer often make the improvement to software (or a program) that is used in the operation data recording device and to software (a program for the external terminal) for collecting the data from the recording device, and a new version is distributed to the users each time the software is improved. The program may be distributed as recorded in a magnetic recording medium. As an alternative, the user may download the program stored in the server on the network.

However, it is troublesome for a distributor to distribute the magnetic recording media to the users. In the case of distributing the program by using the server, on the other hand, it is necessary to contact the user and prompt him to update the program every time the improvement is made. If the update information was not passed to a user for some reasons, the user would continue using the software of the previous version, causing inconvenience.

By the way, the machinery manufacturers wish to use the operation data of the work machine for product development and examination of services. For this purpose, the users are required to supply the operation data having been obtained to the manufacturer, but the sufficient data are not easily gathered due to lack of an advantage for the users to supply the data.

The present invention is to provide an operation data collection system for a work machine in which the latest software can be used at any time for the data acquisition and the acquired data can be easily collected by the maker.

DISCLOSURE OF THE INVENTION (1) The present invention is adopted to an operation data collection system for a work machine that is enabled to detect and record operation data of the work machine with an operation data recording device mounted at the work machine, to allow an external terminal to collect the operation data, and to transmit the operation data from the external terminal to a server located in a remote place.

In this system, when transmitting the operation data, an external terminal program stored in the external terminal and an external terminal program stored in the server, which is of a same type as the program stored in the external terminal are compared to each other to determine which program is newer, and the external terminal program stored in the external terminal is updated with the external terminal program stored in the server if the external terminal program stored in the server is newer than the program stored in the external terminal.

An operation data collection system for a work machine according to the present invention may also be constructed as follows. That is, when transmitting the operation data, a program for the operation data recording device stored in the external terminal and a program for the operation data recording device stored in the server, which is of a same type as the program stored in the external terminal are compared to each other to determine which program is newer, and the program for the operation data recording device stored in the external terminal is updated with the program for the operation data recording device stored in the server if the program for the operation data recording device stored in the server is newer than the program stored in the external terminal.

In this system, when the external terminal collects the operation data from the operation data recording device of the work machine, a program for the operation data recording device stored in the work machine and the program for the operation data recording device stored in the external terminal, which is of a same type as the program stored in the work machine are compared to each other to determine which program is newer, and the program for the operation data recording device stored in the work machine is updated with the program for the operation data recording device stored in the external terminal if the program for the operation data recording device stored in the external terminal is newer than the program stored in the work machine.

(2) The present invention may be adopted to an external terminal that is used by the above-mentioned systems. This external terminal is controlled by an external terminal program stored in advance and comprises a data collection means for collecting the operation data from the operation data recording device; an internal program acquisition means for obtaining an external terminal program stored in a server located in a remote place when transmitting the operation data collected by the collection means to the server; and an internal program update means for updating the external terminal program stored in advance by using the external terminal program thus obtained.

An external terminal according to the present invention my comprise the data collection means described above; a storage means for storing in memory a program for the operation data recording device of the work machine; an external program acquisition means for obtaining a program for the operation data recording device stored in a server located in a remote place when transmitting the operation data collected by the collection means to the server; and an external program update means for updating the program for the operation data recording device stored in the storage means by using the program for the operation data recording means obtained by the external program acquisition means.

It is possible that the external terminal comprises an update means for updating a program for the operation data recording device installed in the work machine by using the program for the operation data recording device stored in the storage means when the data collection means collects the operation data.

(3) A program update method according to the present invention comprises the following steps:

a step of allowing an external terminal to collect operation data of a work machine recorded in an operation data recording device mounted at the work machine; a step of transmitting the operation data to a server located in a remote place from the external terminal; and a step of updating an external terminal program stored in the external terminal by using an external terminal program stored in the server when transmitting the operation data to the server from the external terminal.

A program update method according to the present invention may also comprise the step of collecting the data; the step of transmitting the data; and a step of updating a program for the operation data recording device stored in the external terminal by using a program for the operation data recording device stored in the server when transmitting the operation data to the server from the external terminal. In addition, it is preferable that when the external terminal collects the operation data, a program for the operation data recording device installed in the work machine is updated by using the program for the operation data recording device stored in the external terminal.

(4) When updating the program, it is preferable that versions of programs are compared to each other and the program is updated if a latest version of program is stored.

The external terminal program described above includes a program for collecting the operation data from the operation data recording device, and a program for overwriting a program for the operation data recoding device installed in the work machine. Moreover, the external terminal program may include a program for displaying or processing a collected program.

BEST MODE FOR CARRYING OUT THE INVENTION

The following is an explanation of an embodiment of the present invention, given in reference to FIGS. 1 through 5.

Figure 1:
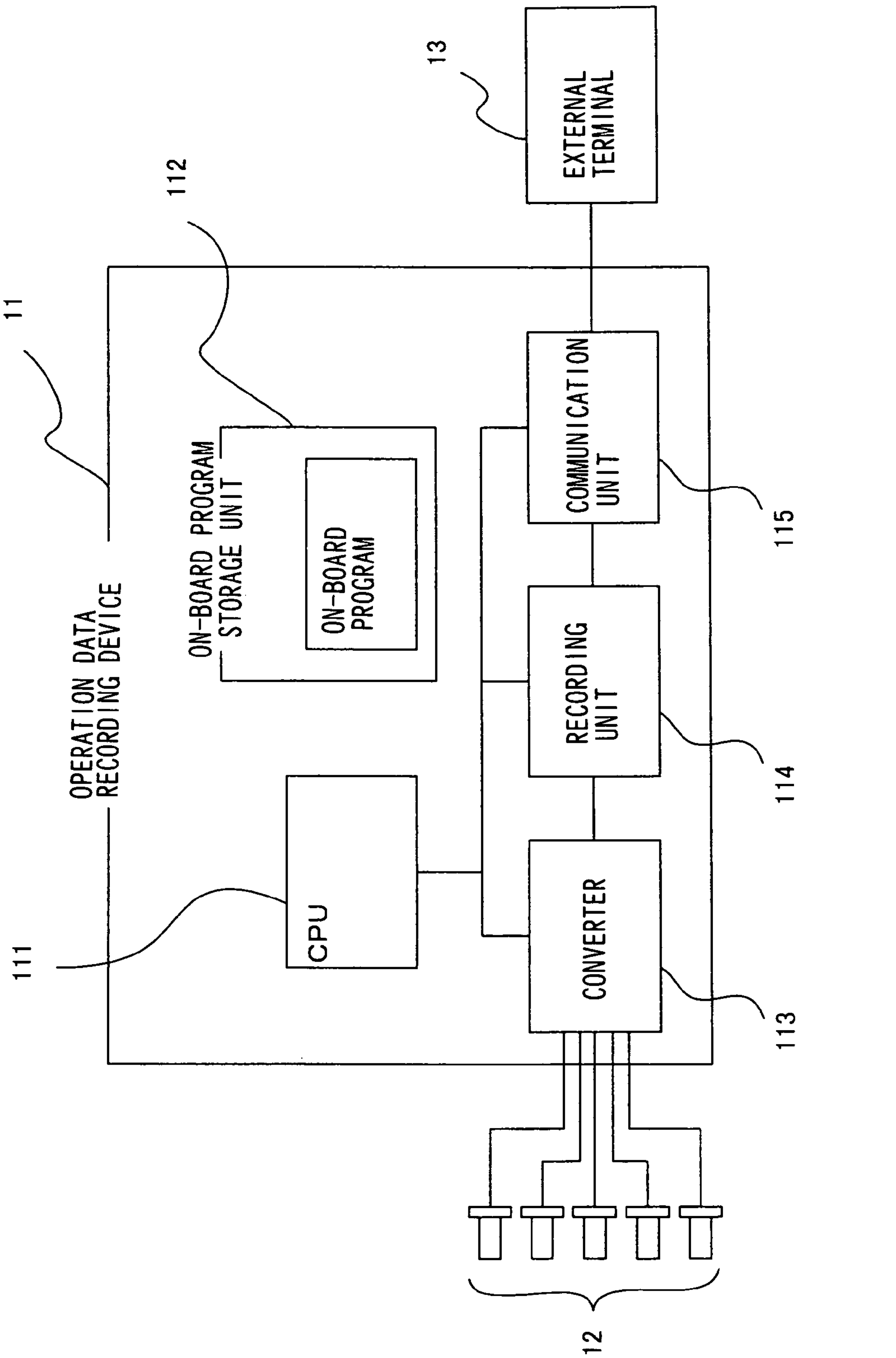
FIG. 1 is a block diagram that shows an operation data recording device of a work machine in an embodiment.

At a work machine, e.g., a hydraulic excavator according to the embodiment, an operation data recording device 11 and its peripheral equipments are installed as shown in FIG. 1. The operation data recording device 11 includes a CPU 111 that controls various arithmetic operations or the like, a program storage unit 112 in which an on-board program (software for the operation data recording device) run by the CPU 111 is stored, a converter 113 that converts the detection output resulted from a sensor group 12 including several sensors into electronic data, a recording unit 114 in which the data thus converted at the converter 113 is recorded or stored, and a communication unit 115 that outputs the data recorded in the recording unit 114 to an external terminal 13.

The sensor group 12 is constituted of a plurality of sensors that each detect, for instance, a rotating speed of an engine, a temperature of the hydraulic oil, a temperature of engine cooling water, and an oil pressure, etc. The CPU 111 processes the detected output from the sensors by using a program for the operation data recording device (hereinafter, referred to as an on-board program) so as to record the detected output in the recording unit 114 as operation data in a predetermined format. For instance, a laptop computer is used as the external terminal 13. By connecting this personal computer to the operation data recording device 11, the operation data is collected through the recording unit 114. The data is collected mainly by a user or a service person, and the collected data is undergone graphic processing or the like and then used to manage the work machine by the person or organization that have collected the data.

Figure 2:
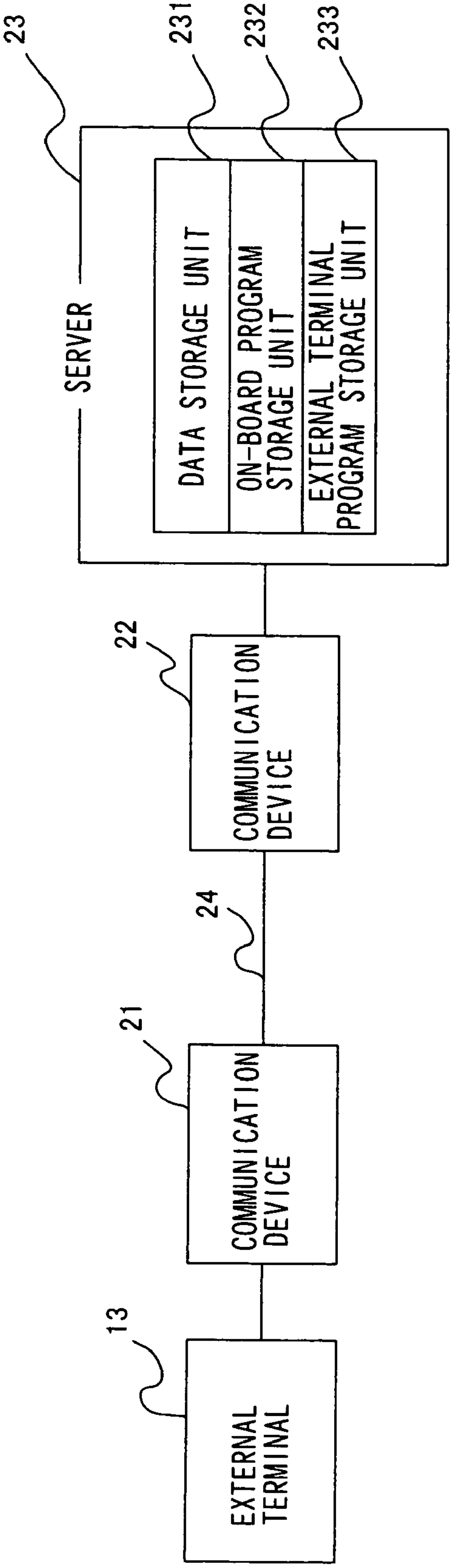
FIG. 2 is a block diagram that shows a communication system between an external terminal and a server.

The operation data stored in the external terminal 13 is transmitted to a base station of the manufacturer in the remote place. A server 23 and a communication device 22 shown in FIG. 2 are installed in the base station. When the operation data is transmitted by connecting a communication device 21 with the external terminal 13, the transmission data is input to the server 23 through a communication path 24 and a server-side communication device 22. A wire communication device, such as the Internet and phone lines, and a radio communication device, for instance, the satellite communication etc, may be used as the communication path 24, however, a type of device used as the communication path 24 is not limited to these example.

The server 23 of the base station includes a data storage unit 231 in which the operation data having been transmitted is stored, an on-board program storage unit 232 in which the latest on-board program is stored, and an external terminal program storage unit 233 in which the latest program for the external terminal is stored. The data stored in the data storage unit 231 is used to develop the new product and to examine service by analyzing it.

The on-board program stored in the storage unit 232 is software used in the operation data recording device 11 of the work machine as mentioned above. On the other hand, the program for the external terminal stored in the storage unit 233 is used in the external terminal 13, and it includes, for instance, software to acquire the operation data from the operation data recording device 11 of the work machine, software to display the acquired data by digitizing and graphing it, software to overwrite the on-board program installed in the work machine, software to communicate with the server 23 in the base station, etc. The version is often improved to these software (programs), and the latest versions are stored in the storage units 232 and 233 respectively. The code (for instance, version number) in which the development time of the program is indicated is assigned to each of the stored programs. It is to be noted that the software to acquire the operation data and the software to overwrite the on-board program installed in the work machine are indispensable for the external terminal 13.

In this embodiment, the above-mentioned software is automatically renewed as the data is collected or transmitted. The details of data collection and data transmission are explained below referring to FIG. 3 and FIG. 4.

Figure 3:
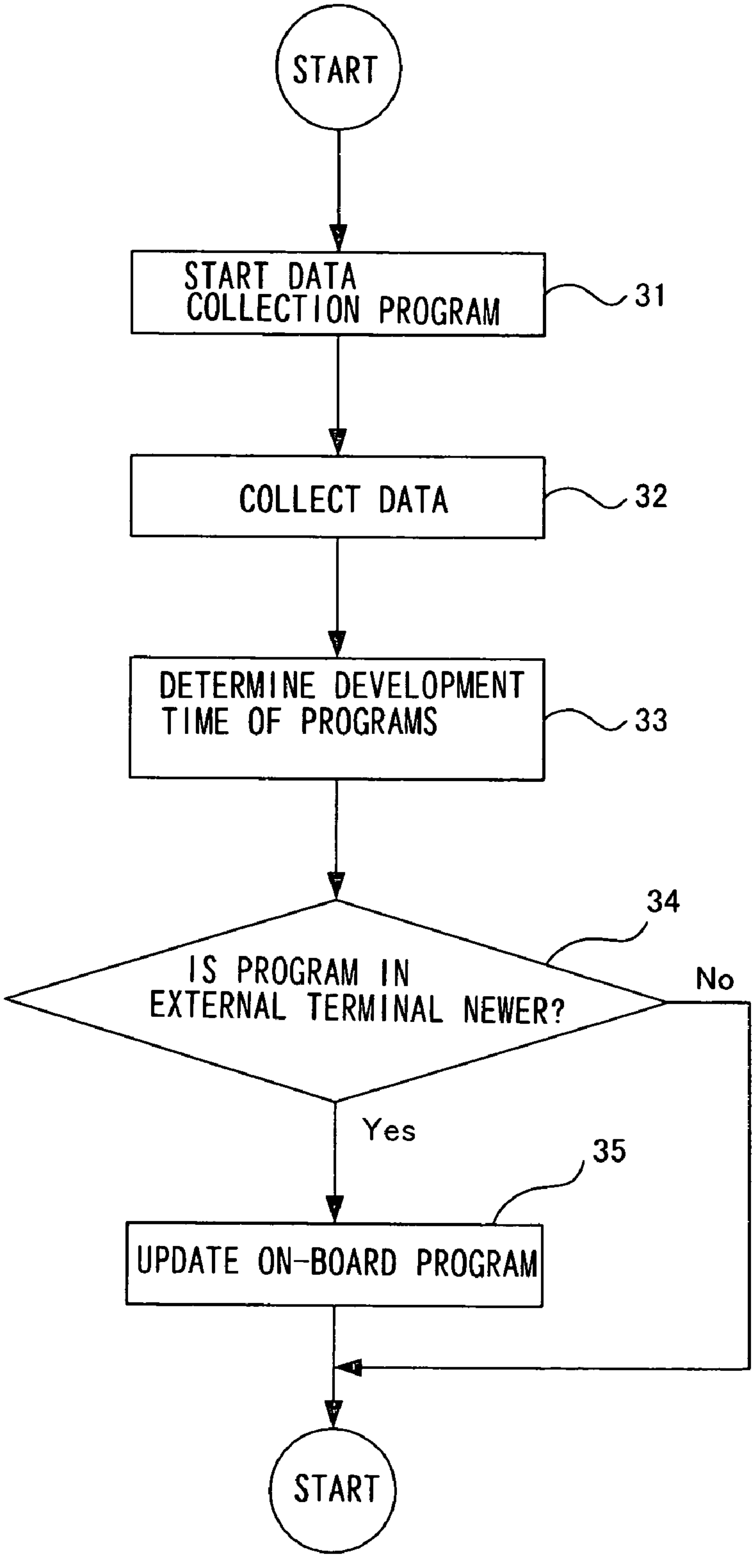
FIG. 3 shows a flow of a procedure for collecting the data with the external terminal.

FIG. 3 shows a flow of the procedure for collecting the data from the operation data recording device 11 of the work machine. That is, the execution procedure of a data collection program stored in a ROM of the external terminal 13 is shown. The user or service person connects the external terminal 13 with the operation data recording device 11 and performs a predetermined operation to start the data collection program. The data collection program instructs the computer to communicate with CPU 111 through the communication unit 115 of the operation data recording device 11, and to demand the operation data. Upon receiving the instruction, the CPU 111 transmits the operation data recorded in the recording unit 114 to the external terminal 13, and then the external terminal 13 takes in the data (step 32). When all of the data is taken in, the development time of the on-board program stored in the on-board program storage unit 112 and the development time of the on-board program stored in the external terminal 13, which is similar to the one stored in the storage unit 112 are compared to each other to determine which program is newer. This is done by comparing each version number. If the on-board program stored in the external terminal 13 is newer as a result of the comparison, the on-board program in the storage unit 112 is updated by the on-board program stored in the external terminal 13. When a negative decision is made in step S34, the program is not updated.

It is to be noted while an explanation was given by way of example that the on-board program was updated after collecting the data, the program may instead be updated before the collection of the data.

As described above, since the on-board program is automatically updated when the operation data of the operation data recording device 11 is collected by the external terminal 13, the operation data recording device 11 can be controlled at any time with the latest software. However, for this purpose, it is necessary that the latest on-board program is stored in the external terminal 13 in advance. The on-board program is stored in the external terminal 13 by following the procedure shown in FIG. 4.

Figure 4:
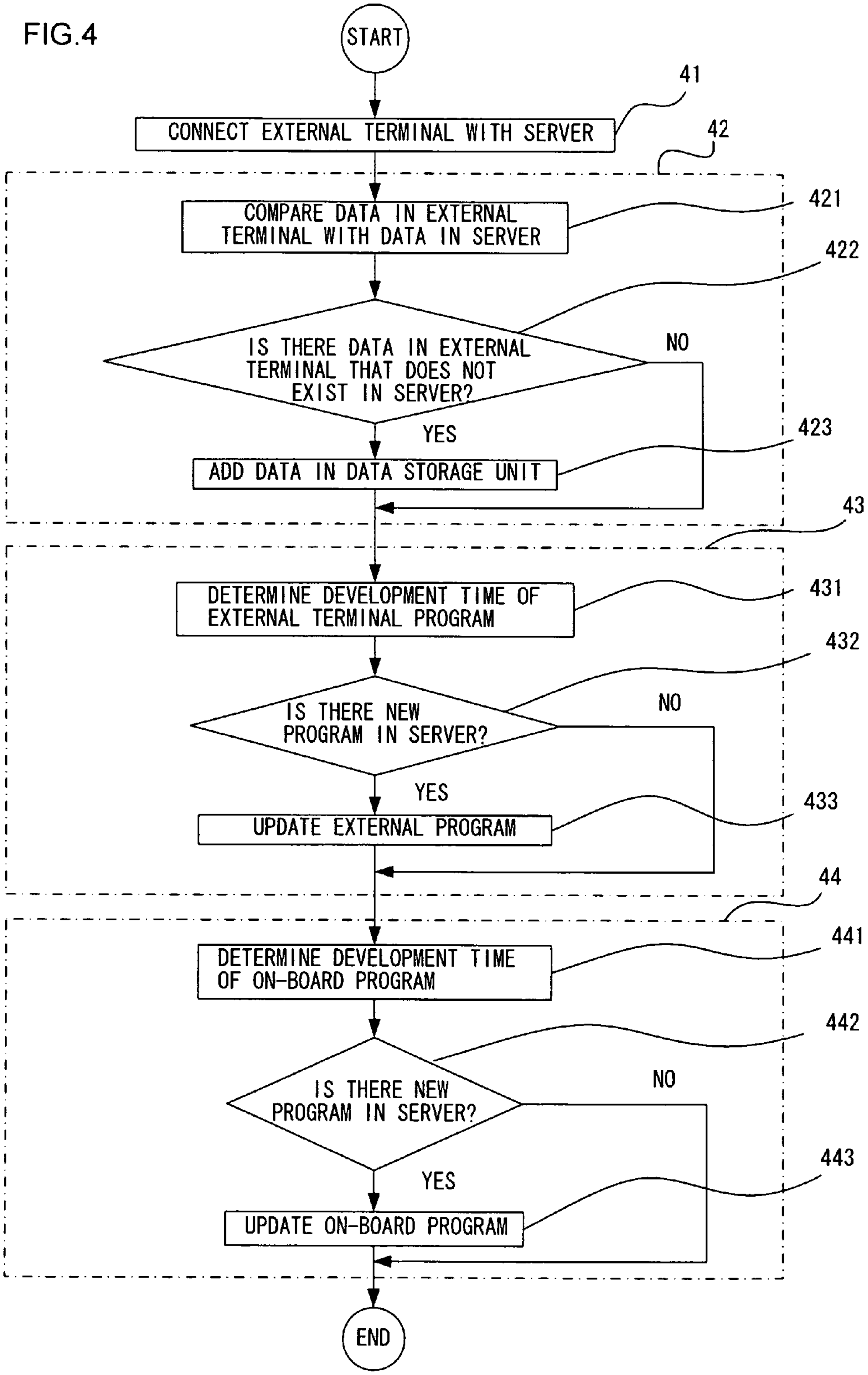
FIG. 4 show a flow of a procedure of a data transfer between the external terminal and the server.

FIG. 4 shows the procedure for transmitting the operation data collected by the external terminal 13 to the server 23 at the base station. This procedure shows the whole execution procedure of a data transmission program stored in the ROM in the external terminal 13.

It is to be noted the whole procedure can be programmed either as the data transmission program stored in the ROM in the external terminal 13 or as a data receiving program stored in the server 23. As an alternative, part of the procedure can be stored in the ROM of the external terminal 13 as a data transmission program, and the other part of the procedure can be stored in the server 23 as a data receiving program.

By connecting the external terminal 13 with the communication device 21, the communication between the external terminal 13 and the server 23 is established (step 41). Then, processing of storing the operation data, processing of updating the external terminal program, and processing of updating the on-board program are executed in order in step 42, step 43, and step 44, respectively. These processings are executed through the cooperation of the communication software of the external terminal 13 and the software of the server 23.

In the data storage processing in step 42, the content of the operation data stored in the external terminal 13, i.e., the operation data collected from the operation data recording device 11 of the work machine, and the content of the operation data stored in the data storage unit 231 of the server 23 are compared to each other (step 421). When it is determined that pieces of data stored in the external terminal 13 do not exist in the server 23, those pieces are added to the data storage unit 231 (step 423).

Next, in the processing of updating the external terminal program (step 43), with respect to the external terminal program mentioned above, the development time of the program stored in the external terminal 13 and the development time of the program stored in the storage unit 233 in the server 23 are compared to each other to find out which is newer (step 431). This is done by comparing each version number. Only when it is determined as a result of the comparison the program stored in the storage unit 233 of the server 23 is newer than the program stored in the external terminal 13, the program in the external terminal 13 is updated by the latest program stored in the server (step 432 to 433).

Next, in the processing of updating the on-board program (step 44), with respect to the on-board program, the development time of the program stored in the external terminal 13 and the development time of the program stored in the storage unit 232 in the server 23 are compared to each other to find out which is newer (step 441). This is also done by comparing each version number. Only when it is determined, as a result of the comparison, the program stored in the storage unit 232 of the server 23 is newer than the program stored in the external terminal 13, the program in the external terminal 13 is updated by the latest program in the server 23 (step 442 to 443).

The order of processings described above is not limited to the above example.

In the embodiment as described above, it is determined whether the external terminal program needs to be updated when the operation data of the work machine is transmitted to the server 23 via the external terminal 13, and the program is automatically updated when it is necessary (step 43). Therefore, the external terminal 13 can be controlled at any time with the latest software by frequently transmitting the data from the external terminal 13 to the server 23. In addition to the update of the external terminal program, the on-board program (software for the operation data recording device) is also automatically updated (step 44). Therefore, the latest on-board program is always stored in the external terminal 13 as the data is frequently transmitted, and thus the operation data recording device 11 of the work machine can be controlled at any time with the latest software by executing the processing in FIG. 3 as described above.

According to the above-mentioned method, it is not necessary to prepare and distribute the magnetic recording media in which the latest software is stored, and also it is not necessary to contact the user to prompt them to update every time the software is improved, reducing a burden imposed on the distributor. For the user, on the other hand, the data transmission and the software update can be done without accessing the server separately. In addition, the user transmits the operation data to the server more frequently, expecting the update of the software and as a result, sets of the operation data can be easily gathered to the base station so as to be used to develop of the new product and to offer the user better service.

It is to be noted that when overwriting or updating the on-board program or the external terminal program, not only all components of the software but also some components necessary to be updated can be renewed. While version numbers are compared to determine which software is newer, the update date of files constituting the software may instead be compared.

Figure 5:
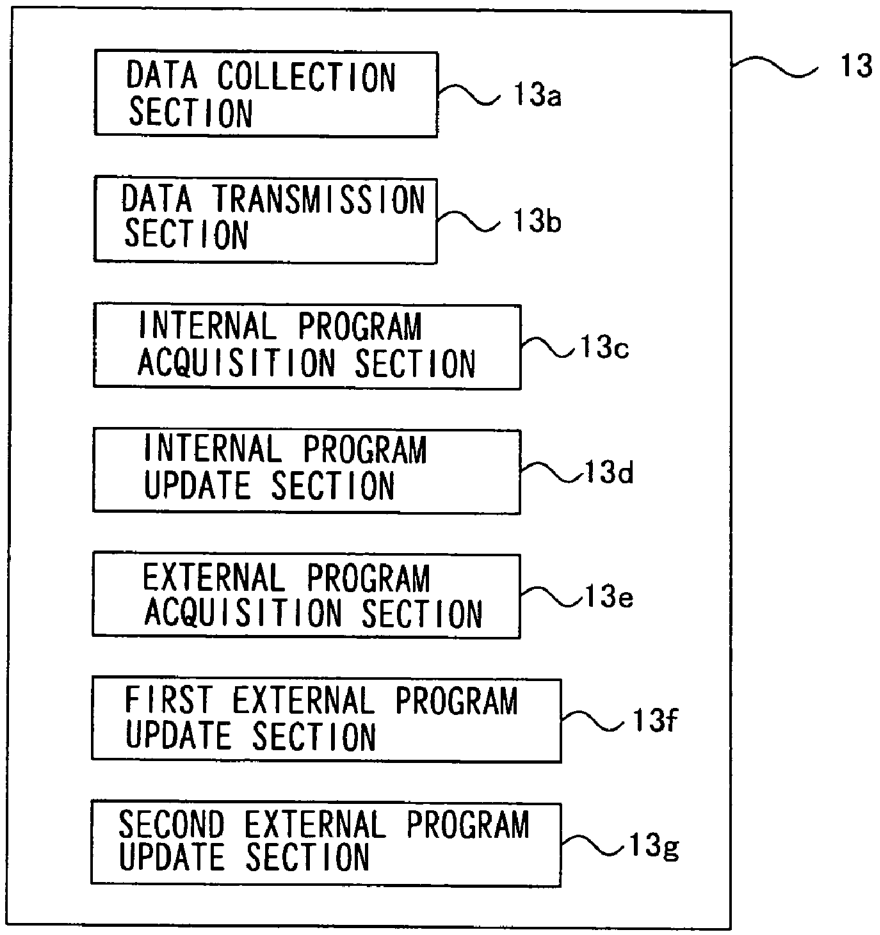
FIG. 5 shows a block diagram illustrating functions of the external terminal.

As described above, the external terminal 13 includes the functions of the data collection, the data transmission, and the program update. That is, the external terminal 13 has the following functions as shown in FIG. 5.

(1) A data collection section 13*a* that collects the operation data from the operation data recording device 11.

(2) A data transmission section 13*b* that transmits the operation data to the server 23 through the communication device 21.

(3) An internal program acquisition section 13*c* that obtains the latest external terminal program stored in the server 23 when the data is transmitted.

(4) An internal program update section 13*d* that updates the external terminal program having been stored by using the latest program stored in the server 23.

(5) An external program acquisition section 13*e* that obtains the latest program for the operation data recording device stored in the server 23.

(6) A first external program update section 13*f* that updates the program for the operation data recording device having been stored by using the latest program for the operation data recording device stored in the server 23.

(7) A second external program update section 13*g* that updates the program for the operation data recording device of the work machine by using the latest program for the operation data recording device when taking in the operation data.

In the case a communication device is built into the external terminal 13, the data can be transferred between the external terminal 13 and the server 23 without using the communication device 21. When the external terminal 13 acquired the external terminal program and the program for the data recording device from the server 23, a comparison of the version of each program was made and each program in the external terminal 13 was updated if the corresponding program stored in the server 23 was the latest version. However, the program may be obtained and updated every time the operation data is transmitted without comparing the versions. The program in the data recording device 11 may also be updated every time when taking in the operation data.

INDUSTRIAL APPLICABILITY

The embodiment mentioned above is explained by way of example, and various modifications to the configuration and the elements can be made without departing from the spirit and scope of the invention.

The invention claimed is:

1. An operation data collection system for a work machine comprising:

an operation data recording device mounted at a work machine, that obtains operation data of the work machine through a processing of a computer which operates by running a program for the operation data recording device;

an external terminal that obtains the operation data recorded in the operation data recording device through a processing of a computer which operates by running an external terminal program; and a server that receives the operation data transmitted from the external terminal through a computer processing, wherein:

the operation data recording device detects and records the operation data of the work machine, the external terminal collects the operation data recorded in the operation data recording device and transmits the operation data to the server, and the external terminal program includes a program for displaying and processing the operation data having been collected, the external terminal comprising:

a data collection device that obtains the operation data from the operation data recording device;

a data transmitting device that transmits the operation data obtained by the data collection device to the server;

an internal program acquisition device that compares an external terminal program stored in the external terminal and an external terminal program stored in the server so as to determine which program is newer by comparing version numbers, and obtains a newer external terminal program from the server when the data transmitting device transmits the operation data;

an internal program update device that updates the external terminal program stored in the external terminal with the newer external terminal program obtained by the internal program acquisition device;

a first external program acquisition device that compares a program for the operation data recording device stored in the external terminal and a program for the operation data recording device stored in the server so as to determine which program is newer by comparing version numbers, and obtains a newer program for the operation data recording device from the server when the data transmitting device transmits the operation data;

a first external program update device that updates the program for the operation data recording device stored in the external terminal with the newer program for the operation data recording device obtained by the first external program acquisition device; and a second external program update device that compares a program for the operation data recording device stored in the external terminal and a program for the operation data recording device stored in the operation data recording device so as to determine which program is newer by comparing version numbers, and automatically updating the program for the operation data recording device stored in the operation data recording device with the newer program for the operation data recording device stored in the external terminal when the external terminal collects the operation data from the operation data recording device.

2. The operation data collection system for a work machine according to claim 1, wherein:

the external terminal program includes a program for collecting the operation data from the operation data recording device, and a program for overwriting a program for the operation data recording device stored in the operation data recording device.

3. A program update method used in an operation data collection system that comprises:

an operation data recording device mounted at a work machine, that obtains operation data of the work machine through a processing of a computer which operates by running a program for the operation data recording device;

an external terminal that obtains the operation data recorded in the operation data recording device through a processing of a computer which operates by running an external terminal program; and a server that receives the operation data transmitted from the external terminal through a computer processing, with the operation data recording device detecting and recording the operation data of the work machine, the external terminal collecting the operation data recorded in the operation data recording device and transmitting the operation data to the server, and the external terminal program including a program for displaying and processing the operation data having been collected, wherein:

the program update method comprises:

a first step for obtaining the operation data from the operation data recording device;

a second step for transmitting the operation data obtained in the first step;

a third step for comparing an external terminal program stored in the external terminal and an external terminal program stored in the server so as to determine which program is newer by comparing version numbers, and obtaining a newer external terminal program from the server when transmitting the operation data in the second step;

a fourth step for updating the external terminal program stored in the external terminal with the newer external terminal program obtained in the third step;

a fifth step for comparing a program for the operation data recording device stored in the external terminal and a program for the operation data recording device stored in the server so as to determine which program is newer by comparing version numbers, and obtaining a newer program for the operation data recording device from the server when transmitting the operation data in the second step;

a sixth step for updating the program for the operation data recording device stored in the external terminal with the newer program for the operation data recording device obtained in the fifth step; and a seventh step for comparing a program for the operation data recording device stored in the external terminal and a program for the operation data recording device stored in the operation data recording device so as to determine which program is newer by comparing version numbers, and automatically updating the program for the operation data recording device stored in the operation data recording device with the newer program for the operation data recording device stored in the external terminal when the external terminal collects the operation data from the operation data recording device, with the first to seventh steps performed by the computer of the external terminal.

4. The program update method according to claim 3, wherein:

in the third and fifth steps, the computer of the external terminal compares versions of programs, and, if a latest version of a program is stored on the server, obtains the latest program from the server so as to update the program with the latest program thus obtained.

5. The program update method according to claim 3, wherein:

the external terminal program includes a program for collecting the operation data from the operation data recording device, and a program for overwriting a program for the operation data recording device stored in the operation data recording device.

* * * * *